Jan. 6, 1942. G. W. JONES 2,268,944
THREADING MECHANISM
Filed Nov. 25, 1939 5 Sheets-Sheet 1

Inventor
George W. Jones
by Wright, Brown, Quinby May
Attys.

Jan. 6, 1942.                G. W. JONES                2,268,944
                         THREADING MECHANISM
                       Filed Nov. 25, 1939          5 Sheets-Sheet 2
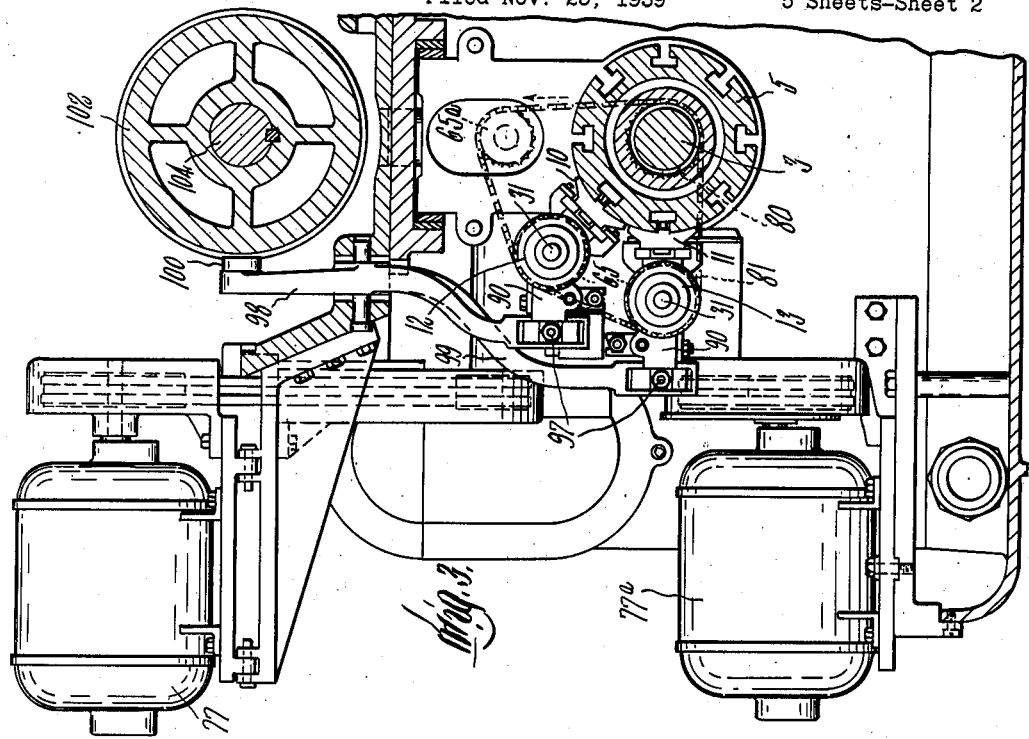
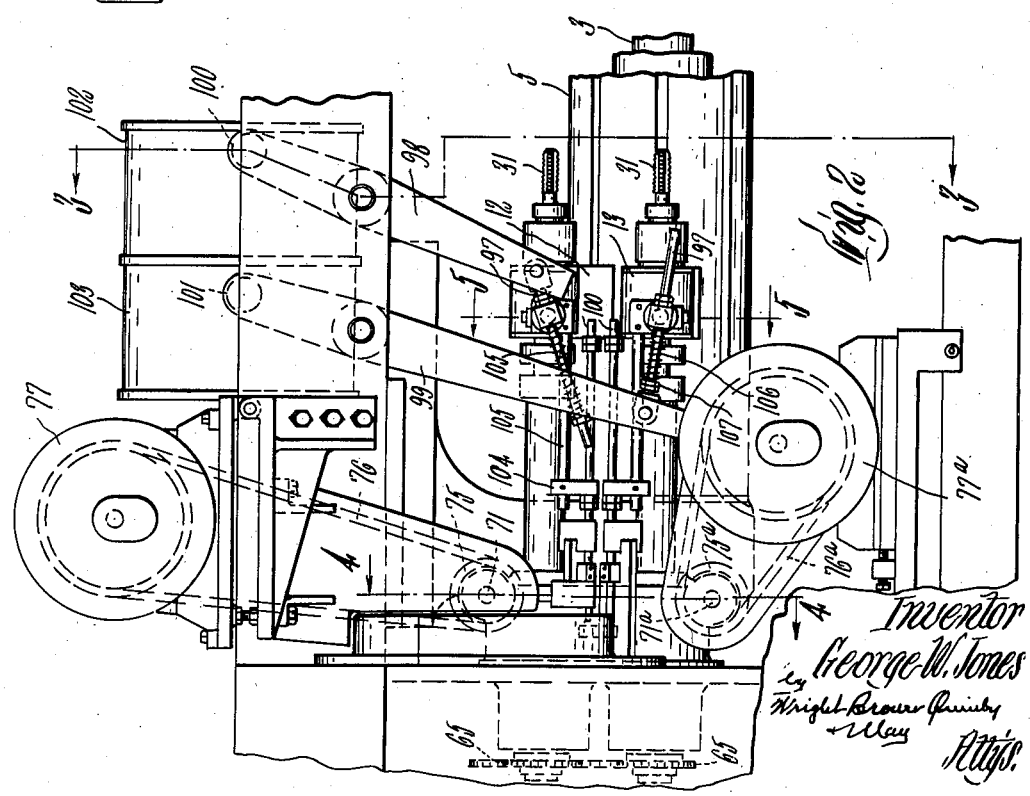
Inventor
George W. Jones
by Wright, Brown, Quinby
& May
Attys.

Jan. 6, 1942.　　　G. W. JONES　　　2,268,944
THREADING MECHANISM
Filed Nov. 25, 1939　　　5 Sheets-Sheet 3
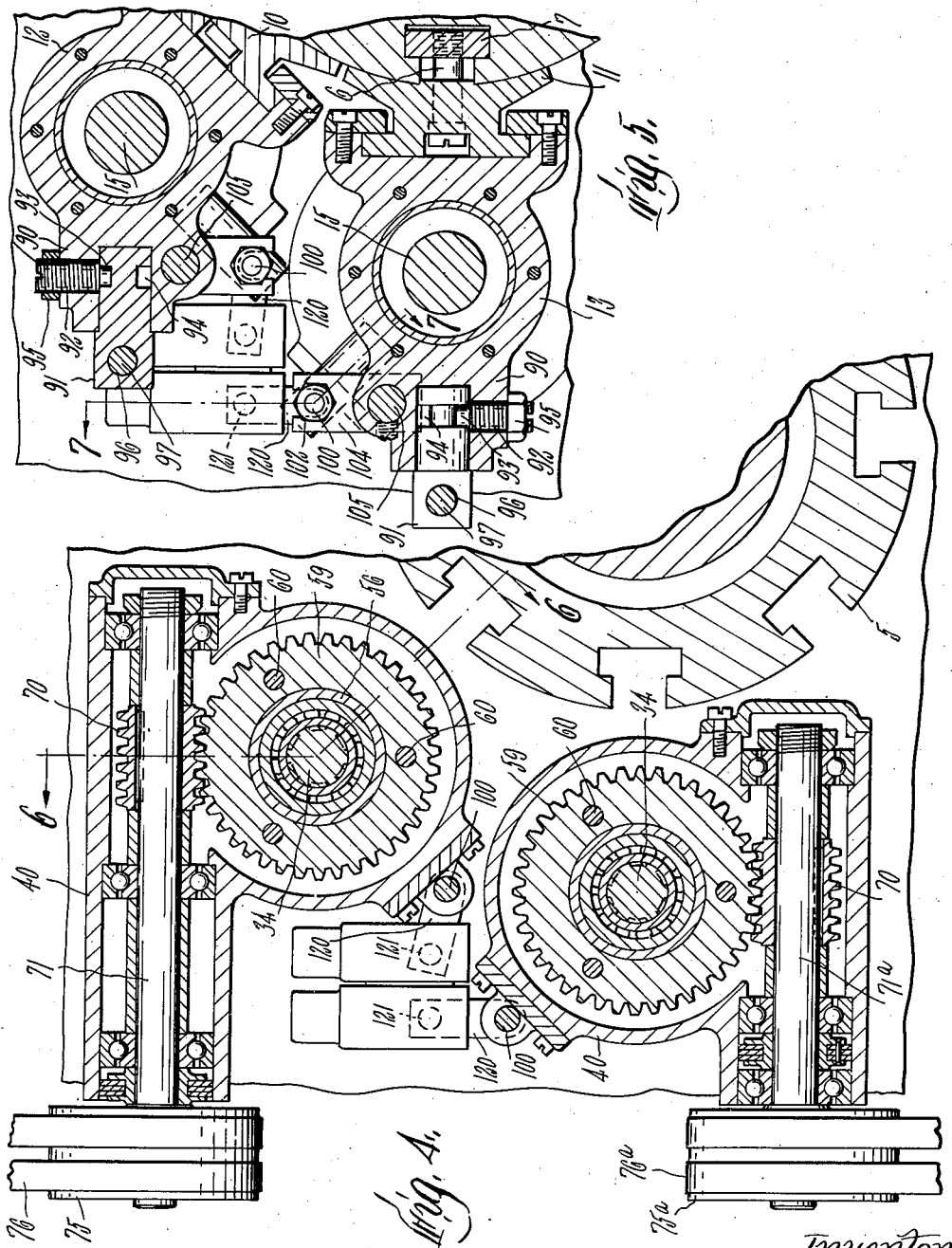

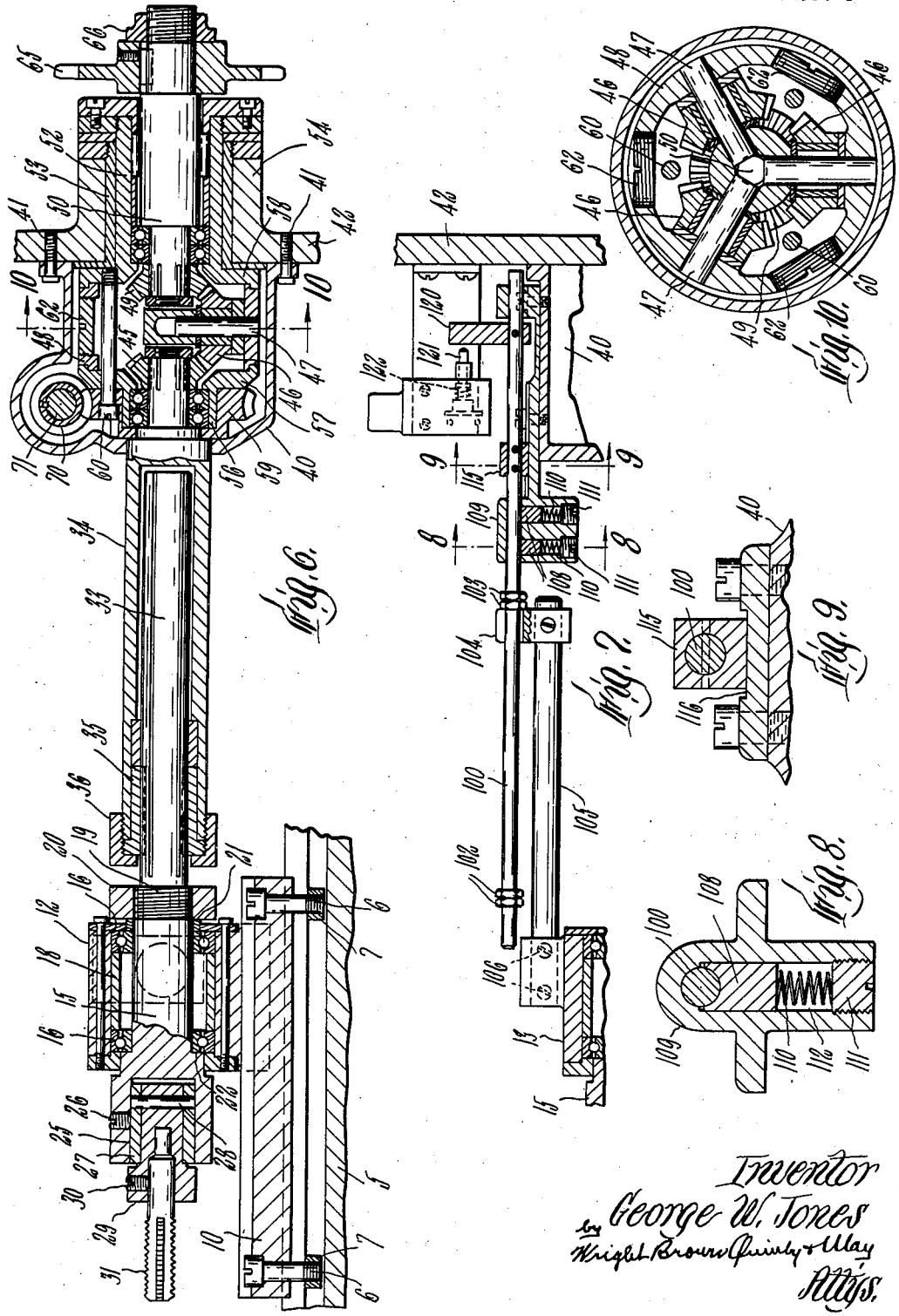

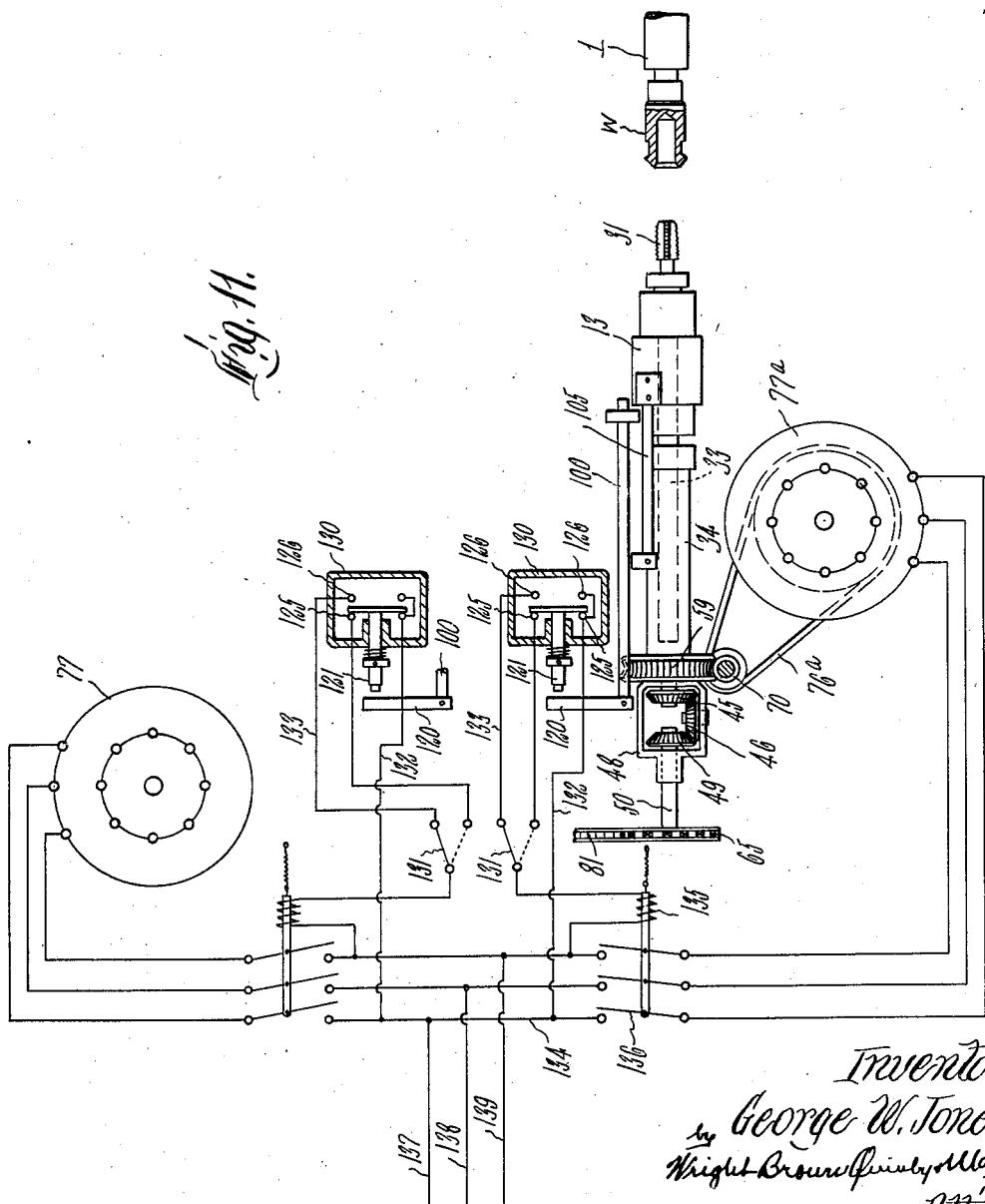

Patented Jan. 6, 1942

2,268,944

UNITED STATES PATENT OFFICE 2,268,944

THREADING MECHANISM

George W. Jones, Windsor, Vt., assignor to Cone Automatic Machine Company Inc., Windsor, Vt., a corporation of Vermont Application November 25, 1939, Serial No. 306,095

6 Claims. (Cl. 10—136)

This invention relates to threading mechanisms particularly designed for threading rotating work. For this purpose it is necessary, in order to thread and then remove the threading tool from the work, to provide for rotation of the threading tool at different speeds, one higher than and the other lower than the rate of rotation of the work, so that there is a relative rotation between the tool and the work first in one direction to cause the tool to feed onto the work and then in the opposite direction to retract the tool from the work.

An object of the present invention is to improve and simplify the mechanism for obtaining these differential speeds and for shifting from one to the other.

A further object is to avoid the use of clutches, change gears, and latch devices in such mechanism.

For a complete understanding of this invention, reference may be had to the accompanying drawings in which—

Figure 2 is a fragmentary rear elevation to a larger scale of the same.

Figures 3, 4 and 5 are detail sections on the correspondingly numbered section lines of Figure 2.

Figure 6 is a detail section on line 6—6 of Figure 4.

Figure 7 is a detail section on line 7—7 of Figure 5.

Figure 1:
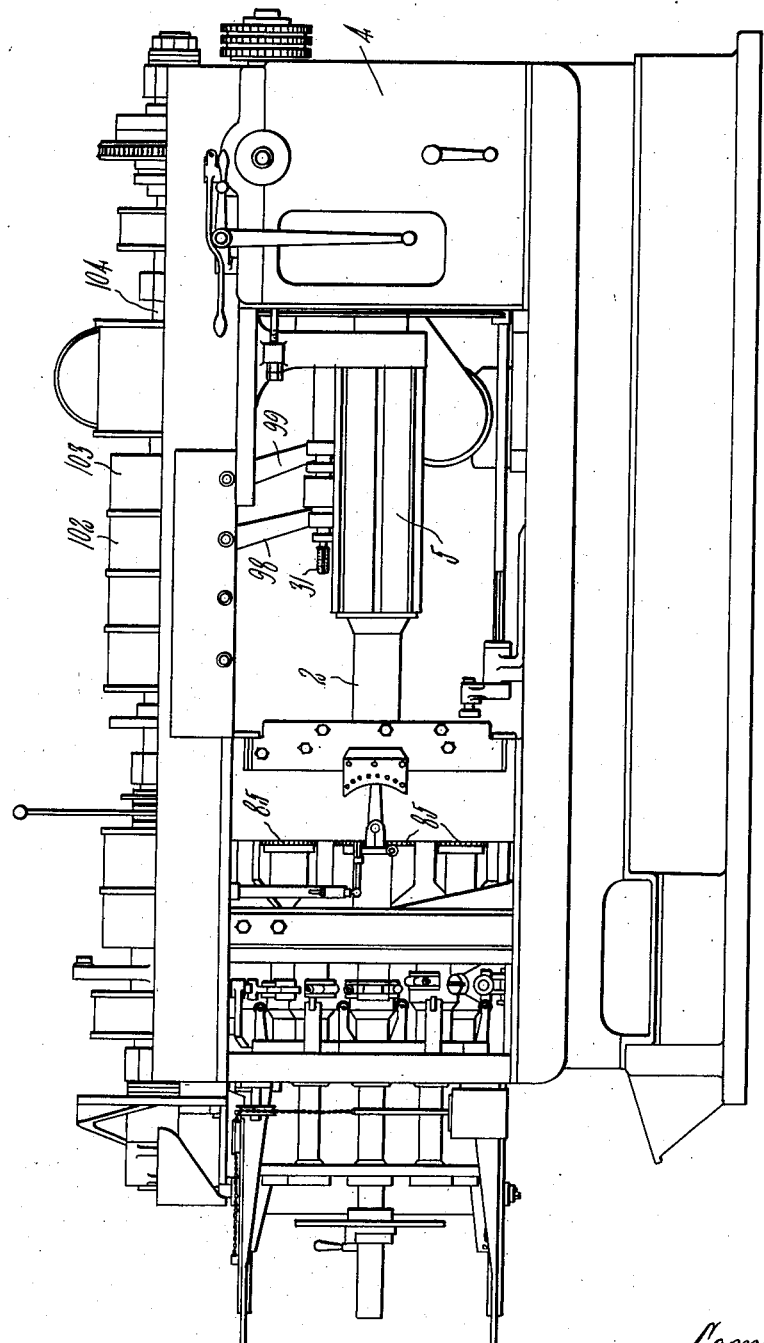
Figure 1 is a front elevation of a multiple spindle automatic lathe embodying the invention.

Figures 8 and 9 are detail sections on lines 8—8 and 9—9, respectively, of Figure 7.

Figure 10 is a detail section on line 10—10 of Figure 6.

Figure 11 is a diagrammatic view showing electrical connections.

In order to carry out the purposes of this invention, means are provided for driving the threading tool in either of two directions relative to the rotating work, mechanism being provided for first causing this rotation to be in a direction to thread the tool onto the work and then after the tool has progressed to the desired extent along the work, to reverse this relative rotation in direction so that the tool is backed off from the work.

One factor effective to simplify the rotating mechanism for the threading tool, and to avoid the use of clutches and latch mechanism, is to provide as a portion, at least, of the drive mechanism for the tool, an individual motor which is rotating only when it is effective to determine one of the relative directions of rotation of the threading tool with respect to the spindle. Thus there is no necessity of connecting or disconnecting a constantly rotating mechanism to accomplish the change from one relative speed to the other, the operation of the motor being controlled readily through the use of switches.

Another factor which may be employed and which is illustrated herein is that of employing one rotating means when the tool is being rotated in one direction relative to the work and algebraically superposing thereon a rotative speed derived from a second drive mechanism to produce the relative rotation between the tool and the work in the opposite direction.

Referring to Figure 1 of the drawings, there is illustrated a multiple spindle automatic lathe of the well known cone type in which a plurality of work spindles, one of which is shown in Figure 11 at 1, is carried in an indexing turret rotatable about the axis of a sleeve 2, the work spindles being presented successively at various tooling stations where tooling operations on the work W carried by the several spindles may be performed. This machine is of the general type illustrated in the Miller Patent No. 2,130,809 granted September 20, 1938. A drive shaft 3 (see Figures 2 and 3) extends through the sleeve 2, this being rotated by suitable drive mechanism housed within the column 4 at the right hand end of the machine as viewed in Figure 1. As illustrated herein, the machine is of the eight spindle type, though the particular number of spindles is quite immaterial for the present invention, and the threading mechanism is shown as applied to operate on work at the sixth and seventh stations. While a tap is shown at each station, one a roughing and the other a finishing tap, any desired threading tool may be employed and the threading may be on the same or different portions of the work.

At angular positions corresponding to these stations, as shown best in Figures 3 and 5, the tool carrier 5 through which the sleeve 2 passes has fixed thereto as by the bolts 6 and nuts 7, the slide guides 10 and 11. These guides 10 and 11 have slidably mounted thereon in directions axially of the sleeve 2, the casings 12 and 13, respectively, in which are journaled threading tool-carrying shafts such as 15 (see Figure 6). As shown each shaft 15 is mounted in anti-friction bearings 16 and is retained against axial motion with respect to its casing 12 or 13. The bearings 16 are shown as spaced as by a sleeve 18 and the shaft 15 has a threaded portion at 19 for the reception of a nut 20 which bears against a collar 21 on the outer face of one of the bearings 16. The other bearing 16 is engaged by an annular shoulder 22 on the shaft 15. The adjacent end of the shaft 15 is provided with a socket 25 within which is secured, as by a set screw 26, a socket member 27. Within the socket member 27 is secured on a pin 28, a tool holder 29 into which may be secured, as by a set screw 30, a threading tool, herein shown as a tap 31. The casings 12 and 13 are mounted for sliding motion axially of the spindles so that by such motion they may be presented to the work and allowed to feed therealong by contact therewith when the relative direction of rotation of the work and the threading tool is in the proper direction and may be allowed to retract when the relative direction of rotation is such as to cause the threading tool to back off.

Each shaft 15 is provided with a shank portion 33 keyed to slide within a sleeve 34 while insuring simultaneous rotation thereof. The keyed connection may be between the portion 33 and a bushing 35 held in place at the outer end of the sleeve 34 as by a threaded retaining collar 36.

The sleeve 34 is rotatably mounted in a planetary gear mechanism contained within a casing 40 secured as by screws 41 to a fixed frame portion of the machine 42. This planetary gear mechanism comprises a bevel gear 45 secured to the inner end of a reduced diameter shaft portion of the member 34, this bevel gear meshing with each of three bevel gears 46, each journaled on a shaft 47 carried by a planetary gear ring 48. The gears 46, in turn, mesh with a gear 49 on a shaft 50 journaled in suitable bearings within a sleeve 52, which is, in turn, journaled in an outer bushing 53 in a boss 54 on the frame member 42. The inner end of the sleeve 34 is similarly journaled within a sleeve 56 having an end flange 57 in opposed spaced relation to a similar flange 58 of the sleeve 52, these flanges supporting between them the gear ring 48. These flanges 57 and 58, and a worm wheel 59 supported on the sleeve 56, are secured together as by the screws 60 forming together a planetary housing rotatable within the casing 40. The gear ring 48 may be provided with openings normally closed by threaded plugs 62 through which lubricant may be supplied to the bevel gears 45, 46 and 49. The outer end of the shaft 50 has keyed thereto a sprocket wheel 65 retained in position as by a nut 66 engaging the threaded extremity of the shaft 50. By rotation of the shaft 50, the planetary gear casing being held stationary, the sleeve 34 is rotated through the intermeshing gears 49, 46 and 45 at the same rate of speed as the shaft 50. By rotating the gear ring 48, however, at the same time that the shaft 50 is rotated, the sleeve 34 will be rotated at a different rate of speed from that of the shaft 50, depending upon the speed and direction of rotation of the gear ring 48.

Means are provided for rotating the gear ring 48 for each of the threading tools. For this purpose, the worm wheel 59 has meshing therewith a worm 70 keyed to a shaft such as 71 and 71a (see Figure 4). These shafts 71 and 71a are suitably journaled in their respective casings 40 and at their outer ends carry drive pulleys 75 and 75a, which, in turn, may be driven as through the belt connections 76 and 76a from the independent motors 77 and 77a. The sprocket wheel 65 may be driven from any suitable source as, for example, from a sprocket wheel 80 on the driving shaft 3. For this purpose there is shown in Figure 3 a sprocket chain 81 which passes about the two sprocket wheels 65, an idler 65a, and the sprocket wheel 80.

The work spindles may also be rotated as from the shaft 3 as by a gear (not shown) fixed thereto meshing with gears 85 (see Figure 1) on their respective work spindles. The speed of rotation of the shaft 50 is different from that of the work spindles and may be either greater or less, but the speed of the sleeve 34, and consequently of the threading tool 31 when the corresponding motor is rotating the worm wheel 59, is also different from that of the work spindle, but this speed differential is in an opposite direction to the speed differential when the motor is stationary.

Means are provided to present the tool to the work when the speed differential is in a direction to cause the threading tool when pressed into engagement with the work to feed thereon, and when the feed has progressed to the desired extent, the mechanism is actuated to produce the speed differential in the opposite direction so as to cause the threading tool to run off from the work. The threading tool is presented to the work either while the motor is rotating or while it is at rest, depending upon whether the threading tool is a right or left handed tool, on the direction of rotation of the work spindle, and whether or not the tool rotation while the motor is in operation is faster or slower than while the motor is at rest. It will be noted that the slides 12 and 13 may be moved relative to their driving mechanism axially of the work without interfering with such drive. Each of these slides 12 and 13 is provided with a bracket portion 90, which may be integral therewith, and in which is mounted for rotation a rock shaft 91, retained in position as by means of a screw 92 having a reduced diameter portion 93 riding in an annular slot 94 in the rock shaft. This screw 92 may be fixed in position as by a lock nut 95. Slidable through an opening 96 in the outer end of each of these rock shafts is a rod 97, the forward end of which is pivoted to the lower end of a lever. The lever for the upper slide 12 is shown at 98 and that for the slide 13 at 99. The upper ends of these levers carry cam rolls 100 and 101, respectively, which are actuated by suitable cams (not shown) on the cam drums 102 and 103 on a cam shaft 104 (see Figure 1) by which various portions of the machine are actuated, as best shown in the Miller patent to which reference has already been made.

Springs 105 and 106 react between the rock shafts 91 and nuts 107 threaded on their respective rods 97, so that by swinging the levers 98 and 99 the corresponding slides may be moved toward their respective work spindles but yieldingly because of the action of the springs 105 and 106. This permits the threading tool to engage the work and as soon as it begins to cut the work it is fed therealong by its engagement therewith, thus threading the work. This takes place until the desired threading limit has been reached, whereupon a switch-actuating bar is moved to either stop or start the corresponding motor 77 or 77a. This mechanism for each of the threading tools comprises a rod 100 (see Figures 7, 8 and 9), having at spaced portions thereof and threaded thereon, the pairs of nuts 102 and 103. Between the nuts the rod 100 is guided through a support 104 carried by a supporting bar 105 which may be secured as by screws 106 to its slide member 12 or 13. As the slide member moves in one or the other direction, therefore, the support 104 will, after a time, impinge upon one or the other sets of nuts 102 and 103, and thereafter will move the rod 100 in the corresponding direction.

In order to prevent too free motion of the rod 100, it may have engaged therewith one or more friction shoes such as 108, which are mounted in a bracket member 109. These shoes may be backed up by springs 110, retained in position by the threaded plugs 111, which close the outer ends of sockets 112 within which the shoes 108 are slidably mounted. A rectangular block 115 secured to the rod 100 and engaging a flat guideway 116 on the bracket 109 holds the rod 100 against rotation. It has secured thereto between the frame member 42 and the block 115 a switch actuating arm 120, which may actuate a switch pin 121 and on moving this pin to the left against the action of a spring 122 it first opens contacts at 125 and then closes contacts at 126 of a switch 130, as shown in Figure 11. There is one of these switches 130 for each of the threading mechanisms. Assuming that the switches 131 shown in this figure are in the full line position, the closing of the contacts 126 closes a circuit through the leads 132 and 133 from a line wire 134 through a switch-closing coil 135 which closes the on and off switch at 136 and energizes the corresponding motor 77 or 77a from the three line wires 137, 138, and 139, thus starting the rotation of the motor. This establishes the reverse speed differential between the threading tool and the work as previously described, thus causing the threading tool to be retracted after the threading operation has been completed. If the switches 131 were in the dotted line position, movement of the corresponding switch actuator 121 would have broken the circuit to the motor through the contacts 125 and the motor which had been running previously in order to produce the proper differential of rotation to cause the threading tool to feed onto the work would stop, thus producing the opposite speed differential and causing the threading tool to retract from the work. It will be noted that this mechanism requires no clutches for controlling the speed differentials and no latch mechanism for changing from one to the other. Thus a very simple mechanism not liable to get out of order has been devised which is exceedingly effective for its intended purpose.

From the foregoing description of an embodiment of this invention, it should be evident to those skilled in the art that various changes and modifications might be made without departing from the spirit or scope of this invention as defined by the appended claims.

I claim:

1. The combination with a rotary spindle and means for rotating said spindle, of mechanism comprising a rotary threading tool for cutting threads on work carried by said spindle, means for rotating said tool at a speed different from that of said spindle, means including a motor for rotating said tool at a speed different from that of said spindle and in the reverse direction to the speed differential between said spindle and tool produced by said first mentioned tool-rotating means, means for presenting said tool to the work carried by said spindle while said speed differential due to operation or lack of operation of said motor is in the direction to feed the tool with respect to the work, and means effective after a predetermined amount of feed to produce by control of said motor to the reverse condition the opposite speed differential to retract the tool from the work.

2. The combination with a rotary spindle and means for rotating said spindle, of mechanism comprising a rotary threading tool for cutting threads on work carried by said spindle, means for rotating said tool at a speed different from that of said spindle, a second means for rotating said tool, means effective on the operation of said second means superposing a tool rotating component from said second means on the rotation of said tool derived from said first mentioned rotating means to produce a speed of rotation of said tool different from said spindle speed and relatively in the opposite direction to the rotation of said spindle from said first mentioned differential speed, means for presenting said tool to work carried by said spindle while said tool is rotating in a direction relative to the work to thread the tool onto the work, and means effective when said tool has progressed to the desired extent relative to the work to condition said mechanism by control of said second tool rotating means to the opposite condition of operation or lack of operation to that which caused threading of the tool onto the work to rotate said tool in the reverse relative direction to cause said tool to back off relative to the work.

3. The combination with a rotary spindle and means for rotating said spindle, of mechanism comprising a threading tool for operating on work carried by said spindle, means including a planetary gear device for rotating said tool at a speed different from that of said spindle, means actuable to rotate said device in a direction and at a rate to change the resultant speed of rotation of said tool to a speed also different from that of said spindle but in the reverse relative direction, means for presenting said tool to the work while said tool is rotating relative to the work in a direction to cause feed of said tool onto the work and with said device stationary or rotating as may be required to produce the required relative rotation of tool and work, and means acting when said tool has progressed to the desired extent relative to the work to condition said mechanism by reversing the condition of said device as to rotation or lack of rotation to drive said tool in the opposite relative direction to retract said tool.

4. The combination with a rotary spindle and means for rotating said spindle, of mechanism comprising a threading tool for operating on work carried by said spindle, means including a planetary gear device for rotating said tool at a speed different from that of said spindle with said device stationary, a motor for rotating said device in a direction and at a rate to change the resultant speed of rotation of said tool to a speed also different from that of said spindle but in the reverse relative direction to said first-mentioned relative speed, an on and off switch for controlling said motor, means for presenting said tool to the work while said tool is rotating relative to the work in a direction to cause feed of the tool along the work, and means acting when said tool has progressed to the desired extent along the work to actuate said switch to control said motor in a manner to cause rotation of said tool in the reverse relative direction to cause withdrawal of said tool from the work.

5. The combination with a rotary spindle and means for rotating said spindle, of mechanism comprising a threading tool for operating on work carried by said spindle, means including a planetary gear device for rotating said tool at a speed different from that of said spindle, a motor for rotating said device in a direction and at a rate to change the resultant speed of rotation of said tool to a speed also different from that of said spindle but in the reverse relative direction to said first-mentioned relative speed, a switch having a normally closed contact and a normally open contact, an electrically operated motor control switch, means for selecting between said normally open and normally closed contacts for controlling said motor control switch, and means acting when said tool has progressed to the desired extent along the work to actuate said first-mentioned switch to open said normally closed contact and to close said normally open contact.

6. The combination with a rotary spindle and means for rotating said spindle, of mechanism comprising a threading tool for operating on work carried by said spindle, means driven by said spindle rotating means for rotating said tool at a speed different from that of said spindle, other means for rotating said tool, said tool rotating means including mechanism for algebraically adding the rotational speed derived from said other driving means to that derived from said spindle rotating means to cause rotation of said tool when said other rotating means is in operation at a speed differential to the rotation of said spindle in the opposite direction than when said other rotating means is idle, means for presenting said tool to work on said spindle when said speed differential is in the direction to cause the tool to thread the work, and means acting when said tool has progressed to the desired extent along the work to condition said other rotating means oppositely as to motion or lack of motion to that which caused the tool to thread the work to cause rotation of said tool in the reverse relative direction and cause withdrawal of said tool from the work.

GEORGE W. JONES.